March 25, 1930.  J. CUNNINGHAM  1,751,510
METHOD AND APPARATUS FOR MAKING JOINTS
Filed Aug. 9, 1928  3 Sheets—Sheet 1

INVENTOR
JAMES CUNNINGHAM
BY
ATTORNEY

March 25, 1930. J. CUNNINGHAM 1,751,510
METHOD AND APPARATUS FOR MAKING JOINTS
Filed Aug. 9, 1928 3 Sheets-Sheet 2
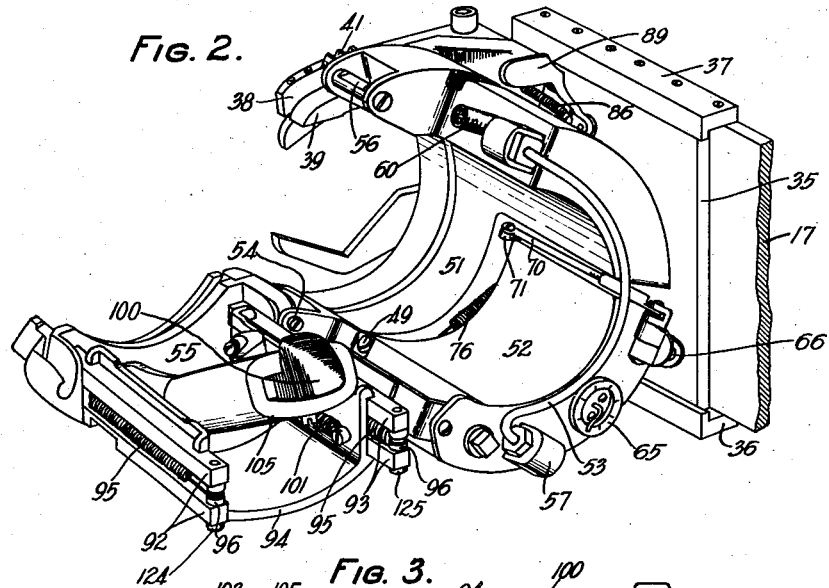
INVENTOR
JAMES CUNNINGHAM
BY
ATTORNEY

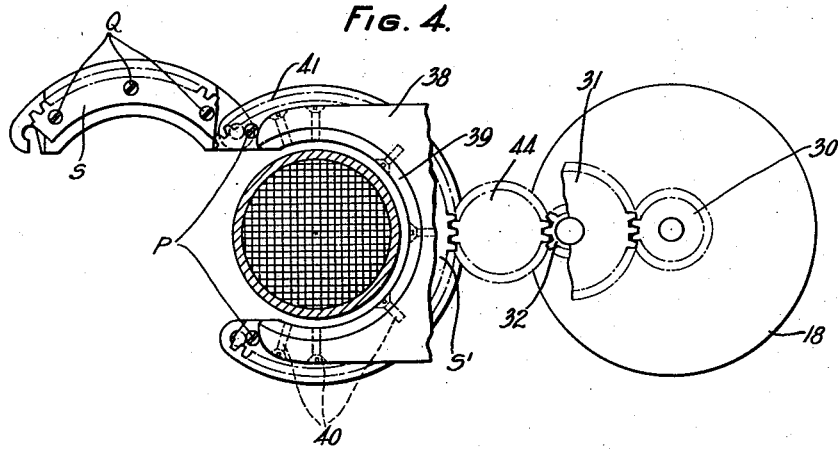
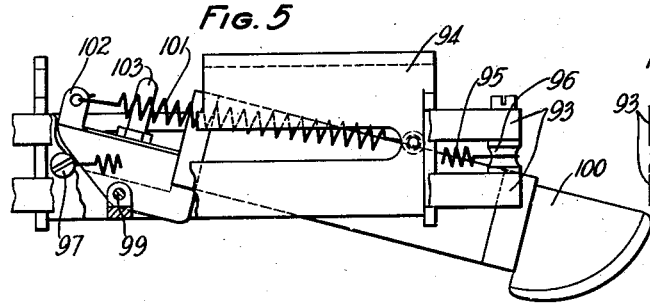
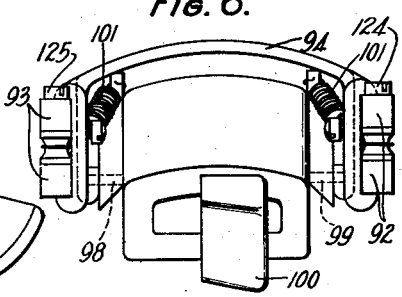
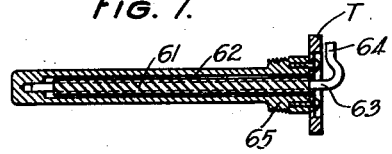
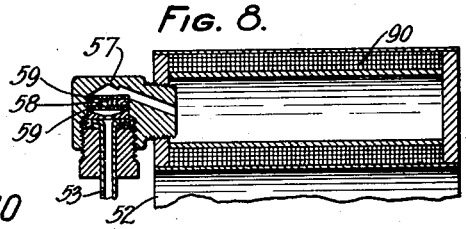
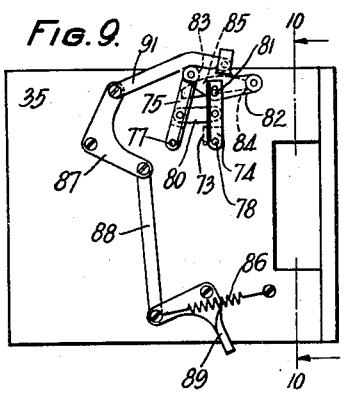
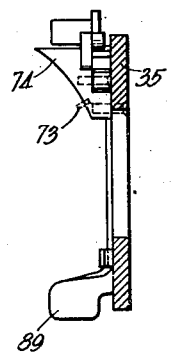
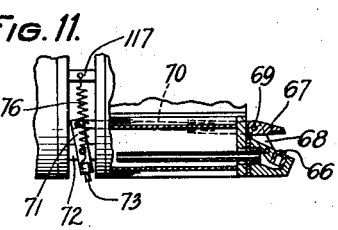

Patented Mar. 25, 1930

1,751,510

UNITED STATES PATENT OFFICE

JAMES CUNNINGHAM, OF RIVERTON, NEW JERSEY, ASSIGNOR, BY MESNE ASSIGNMENTS, TO AMERICAN TELEPHONE AND TELEGRAPH COMPANY, A CORPORATION OF NEW YORK

METHOD AND APPARATUS FOR MAKING JOINTS

Application filed August 9, 1928. Serial No. 298,564.

This invention relates to a novel method of soldering particularly adapted to soldering together sections of lead cable sheath.

Its object is to provide a method which will enable joints to be made more rapidly than with the hand-wiping method now in use, which will result in a large saving of solder while effecting a strong mechanical union, which will effect large savings in the tin content of solder, and which can be successfully practiced by relatively unskilled workers.

In accordance with this invention, molten solder heated electrically or otherwise to a high temperature is forced against the work in a fine stream which is moved rapidly over the work, or the stream is mechanically interrupted so that discrete drops, traveling at high velocity, strike the work. The impact of the high velocity stream, together with the high temperature, enables the solder to alloy instantly with the surface of the work. Due to the fineness of the stream and its motion over the work, or to the time interval between the discrete drops, as the case may be, the solder solidifies as soon as it is deposited on the work. A heated bit may be passed over the joint to smooth the surface.

The solder mass as it builds up is therefore not molten, nor does the work at any time attain the temperature of molten solder. The alloying or tinning on the surface of the work and throughout the solder mass is, however, perfect. Thus a perfect alloying action is secured while maintaining the work at a temperature below the melting point of the solder. This is extremely desirable since joints soldered by this method are more durable than soldered joints heretofore made, since the temper of the lead sheath is not impaired as heretofore.

Another advantage of this method is the saving in solder. With the former method, that is, with wiped joints, a relatively large quantity of solder had to be used to get the cable sheath and sleeve heated to a point where the solder would adhere to the lead sheath. With the present method only sufficient solder need be used to secure a good seal and a good mechanical union.

A further advantage of this method is that joints can be made in less time and by practically unskilled workers. It is well known that a long apprenticeship is necessary to produce a workman who can make satisfactory wiped joints.

Still another advantage is that by virtue of the present method a considerable saving is effected in the cost of tin, since the ratio of tin to lead required in the solder used with this method is much less than that required in wiped joints to secure the necessary tinning effect.

In the particular embodiment of this invention shown in the attached drawing, the method is illustrated as applied to making joints between the ends of two telephone cable sheaths and a lead sleeve which covers the splices in the conductors of the cable. In the machine shown for such use, a frame is provided which is supported so as to enclose the cable and rotate about it at a relatively high speed, for example, 150 R. P. M. under the control of a suitable driving mechanism, such as an electric motor. This frame has a hinged segment which permits the machine to be placed over the cable. The frame carries a solder chamber or tank equipped with a nozzle having a small orifice and a manually controlled valve therefor, the solder being introduced into the tank in molten form and then heated to the required temperature after which a suitable gas, such as dry nitrogen, under pressure is introduced into the solder chamber through a suitable valve, such as a Schrader valve. The frame carries a heated bit or smoothing iron which follows the stream to smooth off any roughness on the surface of the solder mass. After the solder and gas have been introduced into the chamber, the machine is placed over the cable and the hinged segment of the frame is locked in the closed position. The machine is located by suitable means so that the rotating frame is centered around the cable. The motor may then be started and a sliding frame carrying the rotating frame moved by suitable handles thereon toward the lead sleeve bringing the smoothing iron or bit against the sleeve. The valve is then opened and the rotating solder stream is distributed over the joint by moving the sliding frame along the cable. When the joint is built up to a section determined by the shape of the smoothing iron the valve is closed and the sliding frame moved away from the sleeve by the handles. The motor may now be stopped and the machine removed from the table.

Referring to the drawings, Figure 1 is a perspective rear view of the machine;

Fig. 2 is a perspective view of the rotating frame showing the pivoted segment of the frame in the open position;

Fig. 3 is a horizontal sectional view of the machine showing the driving mechanism of the rotating frame and the cable in position therein;

Fig. 4 is a partial end view of the machine showing the gear driving mechanism and the pivoted segment in the open position;

Fig. 5 is a side view of the heating iron or bit carriage;

Fig. 6 is an end view thereof;

Fig. 7 is a sectional view of a thermostat carried by the rotating frame;

Fig. 8 is a sectional view of the solder tank and the filter which admits gas under pressure to the tank;

Figure 9 is a view of the mechanism controlling the closing and opening of the solder tank valve;

Fig. 10 is a side view thereof; and

Fig. 11 is a sectional view of the valve showing its controlling mechanism.

Figure 1:
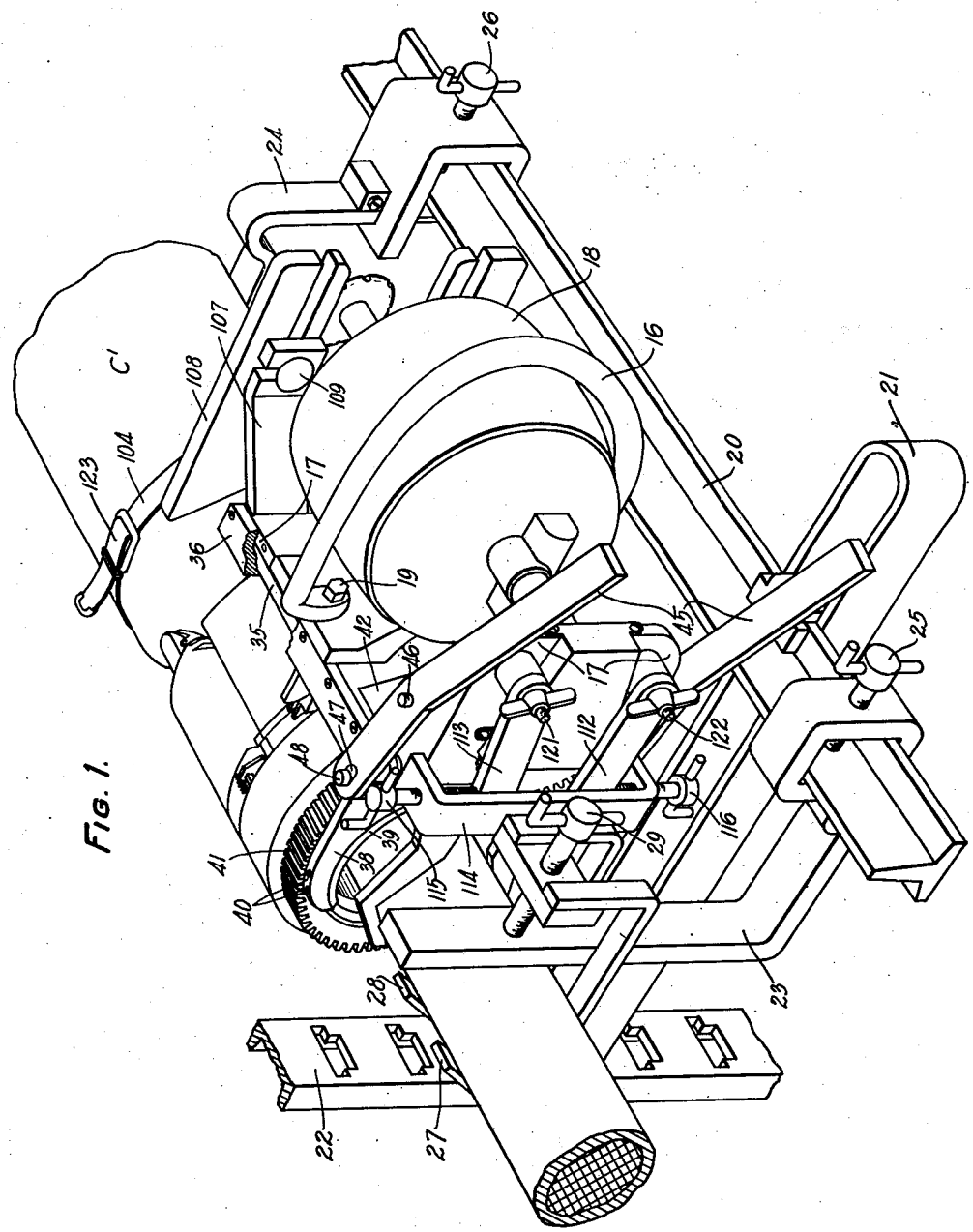

Referring to Fig. 1, 20 is a T-iron rail which is supported at suitable distances on a number of brackets or steps 21, one only of which is shown. These steps engage standard manhole racks, such as 22. The T-rail is secured to these steps by suitable clamps. To the rail 20 are secured, at points on each side of the lead sleeve C', supports 23 which are securely held thereto by set screws 25. Only the support 23 to the left of the sleeve is shown. The free ends of supports 23 extend in an upward direction and each support cooperates with a pair of hooked members 27 and 28 and a screw 29 to form a clamping device for securely holding the cable in position. The free end of a bracket 24, attached to the T-iron rail by a clamp, extends in a horizontal direction and engages the under side of the cable sleeve C' to support the same. It is securely held to the T-rail by a screw 26.

The wiping machine proper is supported at three points: from the cable by means of the clamps 112 and 113, from the sleeve by a strap 104 and a plate 108, and from the T-iron by the handle 16. The clamps 112 and 113 are pivoted on bolts 121, 122 passing through slots in frame 17 permitting the machine to be moved horizontally. The machine may be moved vertically by means of the clamp screws 115, 116 which engage the clamps 112, 113. Plate 108 is secured to brackets 107 secured to frame 17. Plate 108 has a V-shaped end and is attached to brackets 107 by two thumb screws 109 (Fig. 3) extending through slots in brackets 107 and in plate 108, whereby the machine may be moved both vertically and horizontally. A strap 104 is threaded through a number of loops 110 in plate 108 (Fig. 3) and is provided with a buckle 123. By means of plate 108 and strap 104 the machine is supported from the sleeve and may be centered about the cable by adjustment of the plate relative to the frame and by adjustment of the clamps 112 and 113.

In the wiping machine proper as shown in Figs. 1, 2 and 3, 17 indicates the supporting plate or frame hereinbefore referred to on one side of which the motor 18 is mounted. The bolts 19 holding the motor on the plate 17 also serve to hold the handle 16 referred to to the frame. On one end of the motor shaft (Fig. 3) there is mounted a pinion 30 engaging a larger gear 31 which is in turn securely mounted on the spindle portion of a pinion 32. This pinion is journaled at each end in lugs 33 and 34 carried by plate 17. To the side of plate 17 opposite the motor 18 there is mounted a plate 35 (Fig. 2) which is slidably mounted in guiding members 36 and 37 on frame 17 shown in Figs. 1 and 2. On plate 35 is mounted, as by welding, a forked bracket 38 on which the bearing segment 39 is mounted and held securely thereon by a number of screws 40 shown in Fig. 4. On segment 39 there is rotatably mounted a gear 41 (Figs. 1 and 3) which is held thereon against lateral movement by an annular ridge which registers with an annular channel formed by the bracket 38 and the bearing portion ring segment 39. Gear 41 meshes with a pinion 44 which is rotatably mounted on a spindle 43 extending laterally fom a lug carried by plate 35. This gear meshes with pinion 32 but the length of pinion 32 is considerably greater than the width of pinion 44 to permit the movement of plate 35 along its guiding members 36 and 37.

Plate 35 is moved by two manually operated lever members 45 each pivoted on opposite ends of shaft 46 which is in turn supported on a bracket 42 carried by plate 17. One end of each lever has an aperture 47 for engaging the ends of shaft 48 in turn carried by the sliding plate 35.

Gear 41 is formed of two segmental portions S, S' of unequal angular distance as shown in Fig. 4. On the greater segmental portion S' is mounted a gas tank 51 which is securely held thereon by a number of screws P, two of these being shown in Fig. 4, and on gas tank 51 is mounted and secured by screws 49 (Fig. 2) a solder tank 52 provided for a purpose which will be hereinafter described. On gas tank 51 there is pivotally mounted as on pivot 54, an arcuate plate 55, provided at its free end with an aperture adapted to engage with a key 56 carried by the gas tank 51 to form therewith a locking device of the bayonet type. On the outer disposed side of plate 55 is mounted the shorter segmental portion S of gear 41. This segmental portion has an angular distance of about 140° to permit the mounting of the rotating frame on the cable as shown in Fig. 1, and is securely held on the plate 55 by a number of screws P, shown in Fig. 4. By this construction when the gas tank 51 and the plate 55 are interlocked by the rotation of the key 56 to about 180°, the two gear segments S and S' register in a manner to form a continuous annular gear as shown in Fig. 1.

The interior of gas tank 51 is connected to the interior of the solder tank 52 by a pipe 53 connected to a filter 57 shown in detail in Fig. 8. This filter consists of metallic screens 59 and interposed asbestos cloth 58 provided to permit the passage of the gas under pressure but to prevent the flow of solder from the solder tank to the gas tank.

Gas tank 51 carries a Schrader valve 60 to permit the filling of the tank with dry nitrogen or other suitable gas under high pressure.

The temperature indicator is shown in section in Fig. 7. 62 is a tube which screws into the solder tank 52 (Fig. 2). It is closed by a cover T which serves as one bearing for the spindle 63. The cover T is graduated so that the position of the end 64 of the spindle 63 may be easily read. The spindle has welded to it one end of the spiral thermostat element 61. The other end of the element is clamped between the tube 62 and the cover T.

The solder tank has an outlet or nozzle 66 shown in detail in Fig. 11 through which the melted solder is ejected onto the work. The opening and closing of this nozzle is effected through the movement of a finger member 67 in a manner that will be described hereinafter. Finger member 67 has an arm 68 which is pivotally mounted on nozzle 66 (Figs. 11 and 3). Finger member 67 carries a pin 69 engaging one end of a link 70 and the other end of this link is connected to a yoke 71 in turn pivoted on stud 72 on the gas tank 51 (Fig. 3). Yoke 71 carries a pin 73 disposed in engageable relation with two side cams 74 and 75 shown in Figs. 9 and 10. A spring 76 hooked to yoke 71 at a point beyond the pivot thereof and the other end to a stud or spacer member 117 holds the finger 67 in either closed or open position depending upon the position of cams 74 and 75. These cams are pivoted on respective studs 78 and 77 and are held in spaced relation to each other by a link member 80.

Upper free end of cam 74 is engaged by a pin 81 (Fig. 9) mounted on a rocking member 82 which carries rollers 83 and 84 in turn resting on an arcuate guide-way in the form of a segmentary piece 85 with which they cooperate for locking the cams 74 and 75 and the finger member 67 controlled thereby in either open or closed position.

Rocking member 82 is itself manually moved in the locked position on either end of segmentary piece 85, or by an angle lever 89 connected to angle lever 87 by a rod 88, the lever 87 being in turn connected to the upright extending lugs of rocking member 82 by a rod 91, and a spring 86 is provided for holding the lever 89 and the cams 74 and 75 controlled thereby in either position in an obvious manner.

The solder tank 52 insulatedly carries a pair of lugs (not shown) which are connected with the terminals of the heater element 90, shown in Fig. 8, for establishing circuit connection therewith from any source of current supply.

The hinged segment 55 (Fig. 2) carries tracks 92, 93 for a carriage 94 for the smoothing bit 100, preferably of copper. The carriage is caused to move along the tracks by springs 95 hooked to spaced members 96 and to screws 97 mounted on the rear end of the carriage 94. The travel of the carriage is limited by screws 124, 125. On the lugs 98 and 99 (Figs. 5 and 6) of carriage 94 the smoothing bit 100 is pivoted, the effective surface of which is determined by the curve of the joint desired. This bit carries a heating element in the form of a heating coil 106, shown in Fig. 3, and is normally held against the work by springs 95 pulling on the carriage and a tension spring 101 hooked at one end on the front end of the carriage and the other end hooked to an outwardly extending lug 102 on the rear end of the bit as shown in Figs. 2 and 5.

A pair of contact lugs 103 shown in Fig. 3 is provided for establishing circuit connections with the heater element in casing 105.

The operation of the machine is as follows: With the valve 66 closed, solder is introduced into the tank 52 in molten form and heated to a temperature of 875° F. (for 40-60 tin-lead solder) by current applied to heating coil 90. Current is also applied to the heating coil 106 of the bit 100 at this time. Compressed dry nitrogen at a pressure of 20-25 lbs. per square inch is introduced into the gas tank through the Schrader valve. The machine is then placed over the cable and the hinged segment locked in the closed position. The machine is adjusted in position concentric with respect to the cable so that when the sliding frame is drawn as far as possible from the lead sleeve, the bit is approximately $\tfrac{3}{16}''$ from the lead sleeve. The plugs leading current to the heating coils are then removed and the motor 18 started. The sliding frame 35 is then moved toward the lead sleeve C' bringing the bit 100 against the sleeve by means of the handles 45. The lever 89 or the rocking member 82 is then operated to move the cams 74 and 75 in position to engage the pin 73 of yoke 71 for retracting the finger member 67 to open the nozzle 66. The solder stream is distributed over the joint by operating the handles 45. When the joint is built up to a section determined by the shape of the bit 100, the lever 89 or the rocking member 82 is operated for changing the position of cams 74 and 75 as above described for closing the nozzle 66. The sliding frame is then moved away from the sleeve by the handles 45. The motor is then stopped and the machine removed.

In practice, the best results were obtained by rotating the machine at a speed of about 150 revolutions per minute and using a nozzle orifice of .016″ diameter. The shape of effective surface of the bit is very important for the successful operation of the machine. The correct shape is one which due to the rapid rotation of the machine will throw the molten or semi-molten solder with which the bit comes in contact inward toward the cable. This reduces the wastage of solder to a minimum and insures that no holes are left in the solder mass.

The following factors influence the process:

(A) 1. The temperature of the solder when ejected.
2. The diameter of the stream or drops.
3. The velocity of the stream or drops.

(B) 1. The melting point of the soldering alloy.
2. The alloying temperature of the solder with the work.
3. The length of path of the stream or drops.
4. The rate of traverse of the stream over the work or the time interval between the drops.
5. The capacity of the work for absorbing and radiating heat.

These factors are so related that a change in any factor may be compensated for by a change of the opposite sign in a factor of the same group, or by a change of the same sign in the other group.

While the description covers a machine designed for wiping joints on lead sleeves on electrical cable splicers, it is to be understood that the invention is not limited to this application but covers the application of the process to any soldering, brazing, welding or metal coating operation.

Moreover, the data given on temperature, velocity and diameter of stream are typical only, being one of many satisfactory combinations of the operating factors of the invention.

This machine may be used for removing solder joints, but for this purpose a somewhat higher temperature and gas pressure would be desirable, together with the use of a bit whose profile follows closely the cable and sleeve.

What is claimed is:

1. A method of making joints in cable comprising forcing a fine stream of molten metal at a high temperature and high velocity against the parts to be joined and automatically moving said stream at a uniform rate of speed around the cable over said parts.

2. A method of making joints in cable comprising forcing a fine stream of molten metal at a high temperature and high velocity against the parts to be joined, automatically moving said stream at a uniform rate of speed around the cable over said parts, and automatically passing a heated bit over the joint to smooth the surface.

3. A method of making joints in lead cable sheath comprising placing a lead sleeve between two ends of lead cable and rotating a fine stream of molten solder at uniform speed and high temperature against the abutting ends of the sleeve and cable sheath.

4. A method of making joints comprising impinging a mechanically actuated fine jet of molten metal at a high temperature against the junction and operating the jet to deposit a small quantity of metal at each point on the junction at successive regular intervals of time long enough to permit the deposited metal to solidify.

5. A method of making joints comprising impinging a mechanically actuated fine jet of molten metal at high velocity and high temperature against the junction and operating the jet to deposit a small quantity of metal at each point on the junction at successive regular intervals of time long enough to permit the deposited metal to solidify.

6. A method of making joints in cable sheath which comprises forcing a high velocity stream of molten solder at a high temperature against the margins of the cable sheath, and automatically moving the stream around the sheath at a uniform rate of speed.

7. A method of making joints in cable sheath which comprises forcing a high velocity stream of molten solder at a high temperature against the margins of the cable sheath, automatically moving the stream around the sheath at a uniform rate of speed, and passing a heated bit over the joint to smooth the surface.

8. A method of making joints in cable sheath comprising automatically rotating at a uniform rate of speed a fine high velocity, high temperature stream of molten solder around the cable and impinging the stream on the sheath margins.

9. A method of making joints comprising pouring molten solder into a chamber provided with a nozzle having a small orifice and a valve therefor, heating the solder electrically to a high temperature, subjecting the solder to pressure by introducing gas under pressure into the chamber, automatically rotating the chamber at high speed about the sheath at a uniform rate of speed and opening the valve and impinging the molten solder over the sheath margins.

10. A machine for making joints in cable sheath comprising a frame, means for supporting the same to surround the cable, a solder tank on said frame, a nozzle and a valve therefor on said tank, manually controlled means for operating said valve, and driving means for rotating said frame about the cable.

11. A machine for making joints in cable sheath comprising a frame having a hinged segment to permit its being placed around the cable, means for supporting the same centrally about the cable, means to permit its movement longitudinally of the cable, a combined solder and gas tank on said frame, a nozzle and a valve therefor on said tank, manually controlled means for operating said valve, and a motor for rotating said frame about said cable.

12. A machine for making joints in cable sheath comprising a frame, means for supporting the same to surround the cable, a solder tank on said frame, a nozzle and a valve therefor on said tank, manually controlled means for operating said valve, a spring-pressed heated bit on said frame adapted to engage the solder mass as it is built up to smooth the same, and a motor for rotating said frame about said cable.

13. A machine for making joints in cable sheath comprising a frame, means for supporting the same to surround the cable, a solder tank on said frame, a nozzle and a valve therefor on said tank, means for locking on said valve in either position, manually controlled means for operating said valve, a spring-pressed heated bit on said frame adapted to engage the solder mass as it is built up to smooth the same, and a motor for rotating said frame about said cable.

14. A machine for making joints in cable sheath comprising a frame, means for supporting the same to surround the cable, a solder tank on said frame, a nozzle and a valve therefor on said tank, a toggle and connecting rod on said frame for operating said valve, a pair of stationary cams for moving the toggle to open and close the valve, manual means for adjusting said cams to selectively actuate said toggle, means for locking the valve in either position, and a motor for rotating said frame about said cable.

In testimony whereof, I have signed my name to this specification this 26th day of July, 1928.

JAMES CUNNINGHAM.